United States Patent
King et al.

[15] 3,677,641
[45] July 18, 1972

[54] PHOTOGRAPHIC PRINTING APPARATUS

[72] Inventors: James L. King, Rochester; Lee O. Arrington, Hamlin, both of N.Y.

[73] Assignee: Eastman Kodak Company, Rochester, N.Y.

[22] Filed: Aug. 24, 1970

[21] Appl. No.: 66,299

[52] U.S. Cl. ................................................355/83, 355/68
[51] Int. Cl. .....................................................G03b 27/78
[58] Field of Search ................355/83, 67, 68; 356/202, 203

[56] References Cited

UNITED STATES PATENTS

| | | | |
|---|---|---|---|
| 2,444,675 | 7/1948 | Rath | 356/203 X |
| 2,480,424 | 8/1949 | Simmon | 356/203 |
| 3,480,363 | 11/1969 | Stewart | 355/68 |

Primary Examiner—Samuel S. Matthews
Assistant Examiner—Richard L. Moses
Attorney—Walter O. Hodsdon and Robert F. Cody

[57] ABSTRACT

The need for a manual adjustment to the exposure to be made by a photographic printer having average and point-by-point density determining apparatuses is obviated by a device for selecting a principal subject area of a negative from which said point-by-point density data is derived.

9 Claims, 4 Drawing Figures

Patented July 18, 1972

3,677,641

2 Sheets-Sheet 1

JAMES L. KING
LEE O. ARRINGTON
INVENTORS

BY
ATTORNEYS

JAMES L. KING
LEE O. ARRINGTON
INVENTORS

ATTORNEYS

PHOTOGRAPHIC PRINTING APPARATUS

BACKGROUND OF THE INVENTION

1. Field of the Invention

This invention relates in general to photographic printing apparatus; and more particularly, to an improved exposure control system for use in a photographic printer.

2. Description Relative to the Prior Art

Figure 1:
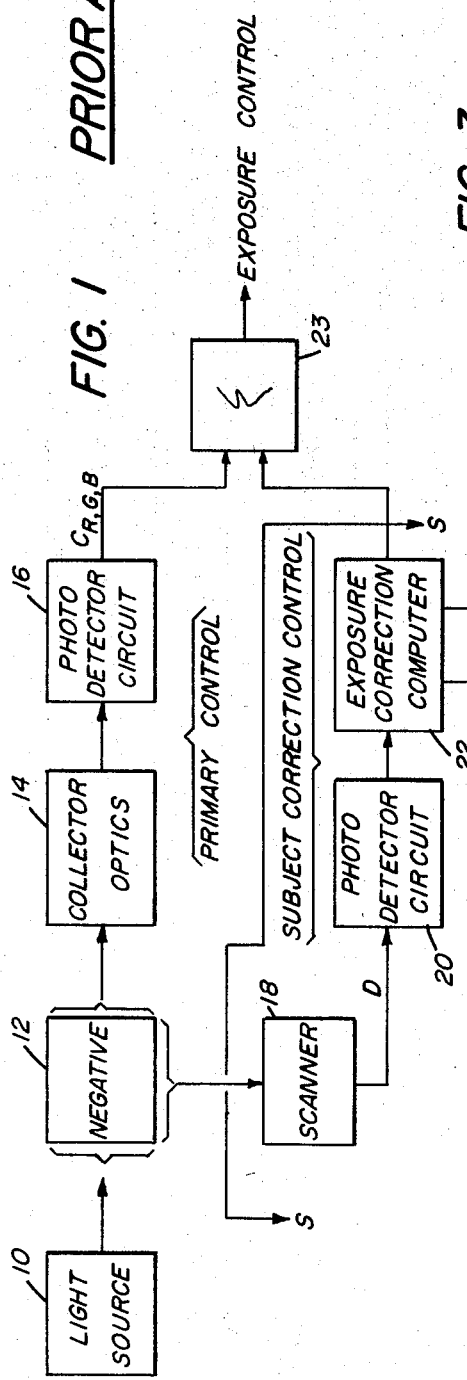
Figure 3:
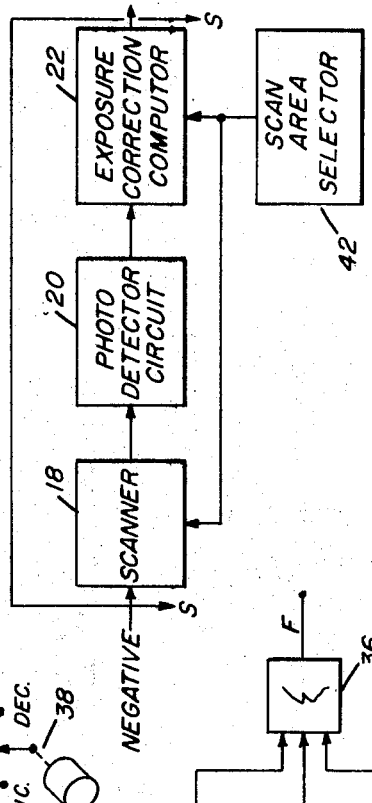
Figure 2:
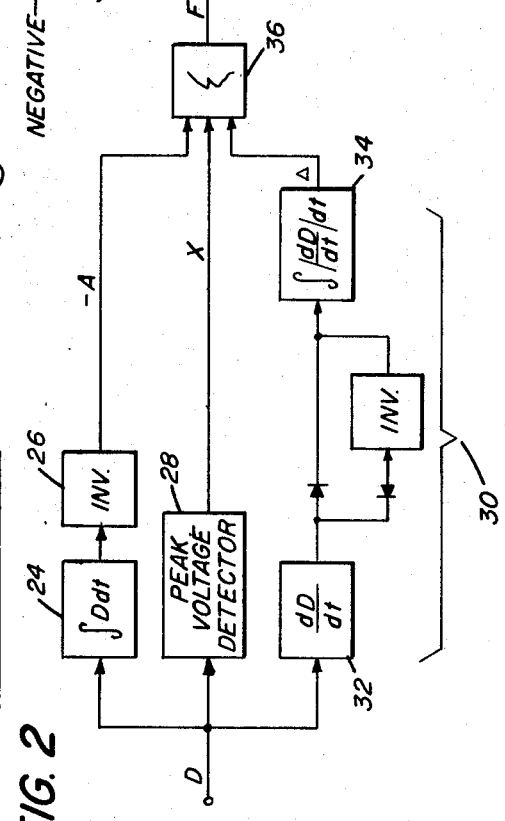
Figure 4:
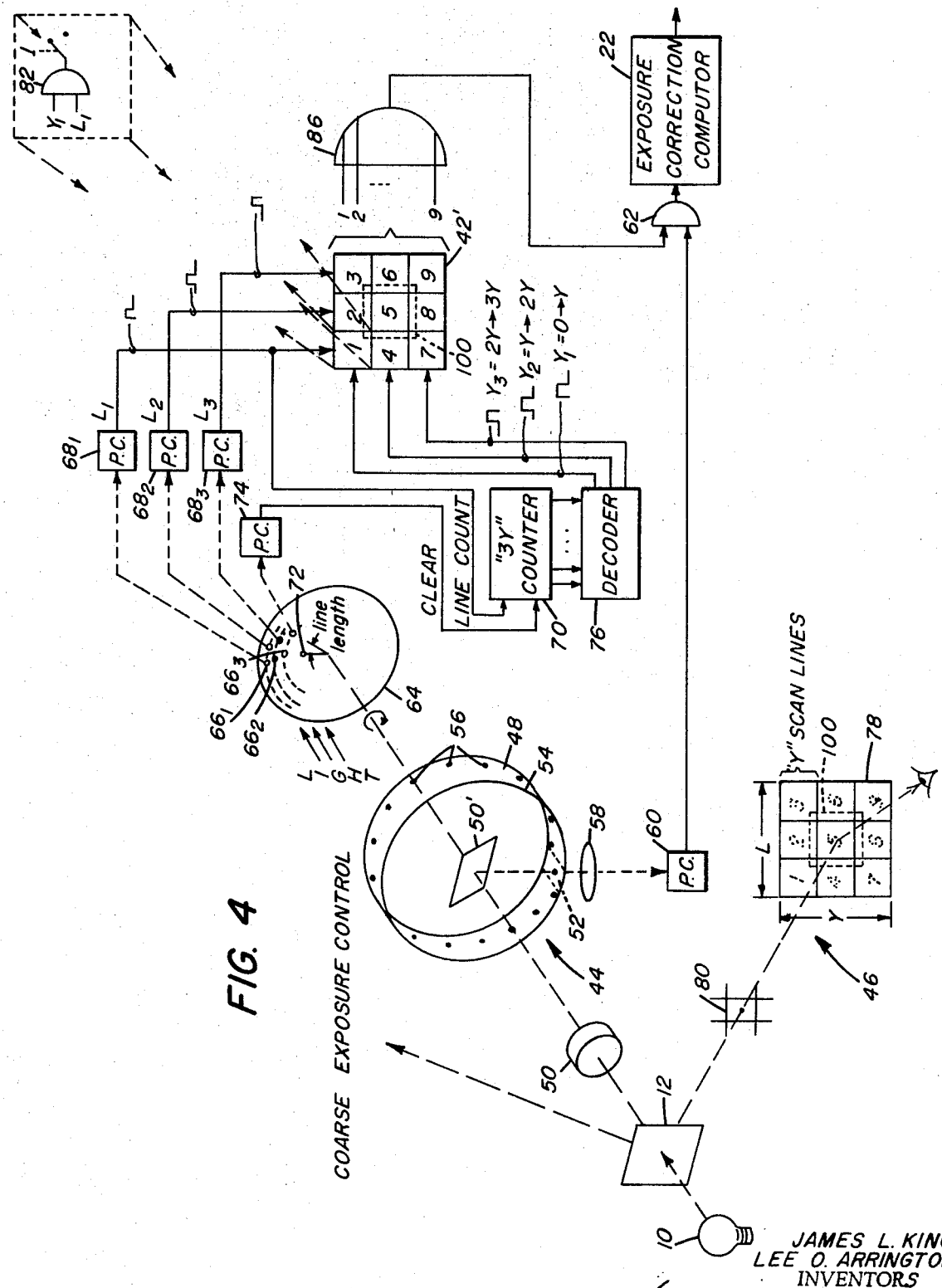

FIG. 1, which is a block diagram of a prior art exposure control system for a photographic printer, and FIG. 2, which is a block diagram of a computer system for use with the exposure control system of FIG. 1, are presented for the purpose of evidencing a problem inherent in the use of prior art photographic printers:

FIG. 3, which is a block diagram illustrating broadly an improved secondary exposure control system according to the invention, and FIG. 4, which is a logical block diagram illustrating a schematic arrangement of one embodiment of the invention.

As indicated in FIG. 1, the prior art exposure control system, over which apparatus according to the invention is an improvement, has primary and secondary exposure control sections. Primary exposure control of a photographic printer which control, incidentally, is adequate usually for about 80 percent of the negatives handled by a printer is derived as follows: A light source 10 illuminates a negative 12 to be printed; and spatially disposed light which is transmitted through the whole negative is collected (14) and directed to a photodetector circuit 16. (Although the photodetector circuit 16 is shown as a single block in FIG. 1, it will be appreciated that, in color printing, the circuit 16 will have three sections, respectively for the red, green, and blue color components of the negative 12.) Prior to adoption of the indicated secondary exposure control system of FIG. 1, it had been the practice for an operator to modify the primary exposure control based on a visual analysis of the negative: The operator would examine the negative to be printed (via a viewing gate) to determine whether the neutral density of the principal subject of the negative was similar to the neutral density of the whole of the negative; and if such was not the case, the printing (red, green, and blue) exposures would be increased or decreased accordingly, viz. by a selected one of several amounts. (Typically, the operator would choose one of nine or ten discrete manual corrections.) This procedure was time consuming and often resulted in comparatively low yields of satisfactory prints, since the operator was required to make difficult relative neutral density judgments. Furthermore, the probability that two operators would similarly judge a negative, or that the same operator would similarly judge a negative for a first and second printing of such negative, was less than would otherwise be desired.

To overcome the inherent shortcomings of the primary, i.e. large area transmittance exposure control of a printer, the secondary or subject correction exposure control section of FIG. 1 was implemented: A scanning device 18 makes a point-by-point neutral density examination of the negative to be printed and applies such density data via a photodetector circuit 20 to an exposure correction computer 22, the output of which is summed (23) with the large area density output(s) of the circuit 16 to produce control signals for the (red, green, and blue) exposure controls of a printer.

The computer 22 works as follows: See FIG. 2.

The average neutral density "A" of the negative is calculated by applying the scan signal D to an integrator 24; the sign of the signal A from the integrator 24 is inverted (26) for a reason which will be apparent below. A signal "X" representing the peak (maximum) density which is detected while scanning the negative is produced by a detector 28 (adapted to receive the signal D. And a contrast signal "Δ" is produced form the signal D by a circuit 30. The circuit 30 includes a differentiator 32 which produces signals representing the rate of change of density while scanning the negative; and an integrator 34 integrates the absolute value of such differential signals to produce the signal Δ. The signals −A, X, and Δ are then algebraically summed (36) to produce a subject correction exposure control correction signal F.

Justification for making the subject correction F proportional to "X" may be appreciated as follows: A relatively small, high density area (e.g. the face of a principal subject) in an otherwise low density negative will be virtually ignored in an exposure control system predicated solely on the large area transmittance (or density) of the entire negative. Hence, the corresponding area in the resulting photographic print will tend to be excessively "light" or underexposed.

Justification for making the subject correction F proportional to "−A" may be appreciated as follows: For a negative of essentially constant neutral density ($\Delta \cong$ zero), the correction term F should be zero, and such will be the case when the signal A is equal to and opposite in sign to the signal X.

Justification for making the subject correction F proportional to the average rate of density change Δ may be appreciated as follows: Negatives obtained from original scenes having abnormally high lighting ratios (highlight to shadow) typically result in underexposed prints when exposure control is predicated solely on large area transmittance. Hence, the rate of density change function Δ is used to increase the correction F for negatives of relatively high macro-contrast. For negatives obtained from "flat" lighting situations, Δ is low and proportionately less exposure is obtained as a result of the influence of the Δ signal on the exposure correction term F.

It is important to appreciate that the prior art of basing the subject correction term F on functions of the scanned density D assumes that these statistical functions have typical relationships to the subject matter as indicated previously. However, when this assumption is invalid, the correction term F will fail to produce a print of satisfactory density. For example, if the maximum density X obtained from a point-by-point scan of the entire negative area is related to some unusually bright object in the scene (windows, skies, etc.) rather than being representative of the principal subject density, the correction term F will not produce the desired exposure levels. Hence, the printer operator must be trained to recognize these unusual density relationships in negatives and to employ an operator-actuated override 38 (not shown in FIG. 2). After visually comparing the neutral density of the principal subject with other "dark" areas in the negative, the operator must decide whether these non-subject areas will produce misleading scan density information, e.g. a scene in which the subject (typically a person) is backlighted and photographed against a bright sky will yield X signals which are much too high to represent the density of the principal subject. To compensate for this violation of the underlying assumptions of the secondary exposure control system, the operator actuates switch 40 to its "INC" or "DEC" contacts; this action causes the exposure correction computer 22 to increase or decrease the exposure(s) as required. While such techniques reduce the number of exposure correction choices which an operator has to make (viz., one of three choices rather than one of ten), the difficulties of making subjective judgments regarding relative densities of subject matter and the attendant effects on print quality and printing production rates are still evident in the prior art.

SUMMARY OF THE INVENTION

The present invention is predicated on the fact that, while it may be difficult to tell whether the neutral density of the principal subject of a photographic negative is more or less than, or the same as, the neutral density of other areas of the negative, the location of such principal subject within such negative is a comparatively easy thing to do. And thus the invention proposes, in a photographic exposure control system of the type having a primary (large area) exposure control, and a scanning-type secondary exposure control cooperative with the primary control, that scan density data employed for purposes of exposure correction be derived (principally) from that area of a negative containing the principal subject.

In one embodiment of the invention, a keyboard is arranged to coincide areawise with a negative to be printed, each key of the keyboard corresponding to a sub-division of the total area of the negative. Should, for example, the principal subject of the negative reside in the upper right corner of the negative, the upper right key is pushed, causing scan density data to be derived solely from the negative area of principal interest. Thus, operator-dependent density judgments need not be made, and attendantly, printing efficiency obtains.

OBJECT OF THE INVENTION

To provide, for a photographic printer, an improved exposure control system, whereby printing production rates may be increased, and printing operations may be simplified.

FIG. 3 indicates apparatus similar to the subject correction exposure control system of FIG. 1 (S—S), save for the substitution of an "area" selector 42 for the "exposure increase or decrease" override 38 of FIG. 1. Corresponding parts of the two figures are similarly numbered. The selector 42, when actuated by an operator, effectively picks the area of a negative from which subject correction exposure control data is to be derived; and since data corresponding to the selected area is the only data applied to, and operated upon by, the exposure correction computer 22, the resultant scan density functions inherently do not contain misleading information from the rest of the negative. The scan area selector 42 may take a variety of forms: For example, the scan area selector may take the form of a computer adapted to determine automatically the principal subject area of a negative, and in response to such determination to correct primary exposure control in accordance with data corresponding to such "computed" area; or it may take the form of a device that uses scan data from all of a negative, but weights the significance of such data in accordance with an operator-determined area selection, etc.

Reference should now be made to FIG. 4 for the details of a subject correction exposure control based on a negative scanning system that has been modified to accommodate the invention: The negative 12 from which a print is to be made is illuminated by a light source 10. Light transmitted through the negative 12 is directed to a primary exposure control system (see FIG. 1), to a negative scanning system 44, and to a negative viewing station 46.

The scanning system comprises a rotatable drum 48 having a mirror 50' disposed therein. Means for rotating the drum 48 may take any of a variety of forms. The image of the negative 12 is projected by means of a lens 50 and a mirror 50' to the inside surface 52 of the rim 54 of the drum 48; and the rim 54 is provided with helically disposed apertures 56 which, when the drum 48 rotates, successively scan across respective lines of the negative image. Light, therefore, is transmitted through the apertures 56 in proportion to the point-by-point optical density of the negative 12. A lens 58 focuses the light output from the apertures 56 to a photocell 60; and such photocell 60 applies its density dependent output signals to an AND circuit 62.

A timing disk 64, which is rotated in unison with the drum 48, has, in this embodiment of the invention, three staggered apertures $66_{1,2,3}$ for each scanning aperture 56 which appears in the rim 54 of the drum 48. The disk 64 is illuminated by a light source; and radially (with respect to the disk) aligned photocells $68_{1,2,3}$ receive light from their respective apertures $68_{1,2,3}$ successively as the timing disk rotates. (See the waveform outputs from the photocells $68_{1,2,3}$.)

At the start of each scan line, the photocell $68_1$ pulses a counter 70 which is adapted to reset itself after each full rotation of the scanning drum, i.e. after the negative image 52 has been scanned completely. To assure that the count in the counter 70 is always properly representative of a respective scan of the negative image 52, a timing aperture 72 is provided in the disk 64; and such aperture 72 cooperates with a photocell 74 (radially aligned like the photocells $68_{1,2,3}$) to reset the counter at the start of each rotation of the drum 48.

A decoder 76 cooperates with the counter 70 to excite one of its three output leads depending on whether the count of the counter 70 is between zero and Y, between Y and 2Y, or between 2Y and 3Y; and such decoder, like the photocells $68_{1,2,3}$, cooperates with a keyboard 42' in a manner to be described momentarily. The keyboard 42' which may take any of a variety of forms is of the type which, when a key is pressed, all other keys are effectively released.

The negative 12 may be viewed directly, or indirectly by means of a screen 78 as shown. In either event, however, it is desirable to employ a reticle 80 for optically sub-dividing the negative into several smaller areas (nine equisized areas in this embodiment).

Assume the principal subject of the negative resides within the corner of the negative 12 which corresponds with the keyboard location "1": The printer operator, on seeing this, and ignoring matters of neutral density comparisons, presses key number "1"; and for the first third of each scan line, a circuit cooperative with key number 1 is actuated. That is, simultaneously occurring signals $Y_1$, $L_1$ cause an AND gate 82 to apply an output signal via the key-operated switch "1" to an OR circuit 86. The OR circuit 86 in turn applies its output to the AND circuit 62 so that such AND circuit 62 can apply scan density signals to the exposure correction computer 22 for the time that the scanning drum 48 is examining the area "1" of the negative. Similarly, if the principal subject of the negative had occupied, say negative area 8, second third ($L_2$) of each scan line within the last third ($Y_3$) of all such lines, key number 8 would have been pressed by the operator, etc.

Whereas apparatus according to the prior art produces neutral density scan data signals from the whole of a negative, which data has to be subjectively monitored by an operator, to correct primary exposure control within a printer, apparatus according to the invention obviates such subjective monitoring by the use of scan data derived from a selected area of a negative containing the principal subject of such negative.

The invention has been described in detail with particular reference to preferred embodiments thereof, but it will be understood that variations and modifications can be effected within the spirit and scope of the invention. For example, it is within the purview of the invention to employ for most negatives a normally-engaged scan selector that limits negative scanning to the production of scan data signals that correspond with a centrally disposed negative area 100 (see FIG. 4); and to employ a keyboard selector solely for the purpose of zeroing in on a selected negative area.

What is claimed is:

1. In a photographic printer having:
   a. control means for regulating the exposure of print material, and
   b. means responsive to the density characteristics of the means to be printed for controlling the operation of said control means, said responsive means comprising:
      1. means for producing a signal proportional to the average density of said means to be printed,
      2. means for scanning said means to be printed and producing signals representative of the point-by-point density characteristics of at least some area of said means to be printed,
      3. means adapted to receive said signals from said scanning means for producing a correction signal, and
      4. means for combining said average density signal and said correction signal into a resultant signal, said resultant signal being applied to said control means for regulating said exposure of said print material, the improvement of means cooperative with said responsive means for producing signals corresponding to a set of point-by-point density characteristics for respective areas within said area of said means to be printed, and means for weighting the different point-by-point density characteristics within said set thereof according to the respective areas of said means to be printed, thereby to produce a correction signal for said average density signal.

2. In a photographic printer having:

a. control means for regulating the exposure of print material, and
b. means responsive to the density characteristics of the means to be printed for controlling the operation of said control means, said responsive means comprising:
1. means for producing a signal proportional to the average density of said means to be printed,
2. means for scanning said means to be printed and producing signals representative of the point-by-point density characteristics of at least some area of said means to be printed,
3. means adapted to receive said signals from said scanning means for producing a correction signal, and
4. means for combining said average density signal and said correction signal into a resultant signal, said resultant signal being applied to said control means for regulating said exposure of said print material, the improvement of means cooperative with said responsive means for selecting an area from within said area of said means to be printed form which said correction signal shall be predominantly dependent, said means for selecting comprising a plurality of switch means, each of which corresponds to a respective area of the means to be printed.

3. The improvement of claim 2 including a reticle for defining the respective areas of the said means to be printed.

4. The improvement of claim 2 wherein said switch means are arranged in the form of a keyboard, the respective keys of which are positioned on said keyboard to correspond positionwise with respective areas of and within said means to be printed.

5. Apparatus for use with a photographic printer comprising:
a. means for scanning a negative from which a print is to be made to produce signals representative of the point-by-point optical density of said negative,
b. means for selecting from all said density signals those signals which correspond to a selected area of interest within said negative,
c. means adapted to receive said selected signals for computing therefrom a control signal, and
d. means responsive to said control signal for regulating in accordance therewith the exposure of said printer.

6. The apparatus of claim 5 wherein said selecting means comprises a keyboard, and respective switch means cooperative with the keys of said keyboard, said switch means being respectively adapted to apply selected signals from among said density signals to said exposure regulating means.

7. The apparatus of claim 6 wherein said keyboard has an area format substantially like the area format of a negative to be printed by said printer, and wherein each of said switch means cooperative with the said keys is adapted to apply to said exposure regulating means density signals respectively corresponding to a respective area within said negative.

8. The apparatus of claim 7 including reticle means cooperative with said negative to subdivide said negative into areas corresponding to the arrangement of keys on said keyboard.

9. In a photographic printer,
a. means for scanning line-by-line a means to be printed and producing therefrom signals representing the point-by-point optical density of said means to be printed,
b. means for dividing the signals from each of said scan lines into line-segment groups of signals,
c. means for grouping the signals from said scan lines into sets of signals,
d. means for selecting signals which simultaneously obtain in a given set and a given group of signals, and
e. means responsive to the selected signals for controlling the printing exposure of said printer.

* * * * *